United States Patent [19]

Shavit et al.

[11] Patent Number: 5,586,321
[45] Date of Patent: Dec. 17, 1996

[54] DIFFRACTING TOKEN ROUTER AND APPLICATIONS THEREOF

[75] Inventors: Nir Shavit, Tel Aviv; Asaph Zemach, Ramat Hasharon; Dan Touitou, Ramat Gan, all of Israel

[73] Assignee: Ramot Ltd., Tel Aviv, Israel

[21] Appl. No.: 392,009

[22] Filed: Feb. 21, 1995

[51] Int. Cl.$^6$ .............................. G06F 9/00; G06F 13/14
[52] U.S. Cl. ...................... 395/672; 395/477; 395/728
[58] Field of Search ............................. 377/1, 27, 130; 395/200.01, 200.06, 856, 477, 650, 700, 728, 800

[56] References Cited

U.S. PATENT DOCUMENTS

| | | | |
|---|---|---|---|
| 4,588,890 | 5/1986 | Finnes | 250/307 |
| 4,670,652 | 6/1987 | Ichihashi et al. | 250/310 |
| 4,751,384 | 6/1988 | Murakoshi et al. | 250/310 |
| 4,794,646 | 12/1988 | Takeuchi et al. | 382/8 |
| 4,803,357 | 2/1989 | Brust | 250/310 |
| 4,805,123 | 2/1989 | Specht et al. | 364/559 |
| 4,808,821 | 2/1989 | Feuerbaum et al. | 250/305 |
| 4,818,874 | 4/1989 | Ishikawa | 250/310 |
| 4,835,385 | 5/1989 | Kato et al. | 250/310 |
| 4,851,768 | 7/1989 | Yoshizawa et al. | 324/158 R |
| 4,857,731 | 8/1989 | Tagata | 250/310 |
| 4,871,911 | 10/1989 | Van Gorkom et al. | 250/310 |
| 4,912,313 | 3/1990 | Kato et al. | 250/307 |
| 4,916,315 | 4/1990 | Otaka | 250/310 |
| 4,933,552 | 6/1990 | Lee | 250/310 |
| 4,941,980 | 7/1990 | Halavee et al. | 250/310 |
| 5,097,127 | 3/1992 | Hildenbrand et al. | 250/310 |
| 5,111,043 | 5/1992 | Shigenaka et al. | 250/306 |
| 5,182,454 | 6/1993 | Matsuda et al. | 250/310 |
| 5,229,607 | 7/1993 | Matsui et al. | 250/306 |

OTHER PUBLICATIONS

S. Lacourte and M. Riveill, "Generic System Support for Shared Object Synchronization", Object Orientation in Operating Systems Int'l Workshop, pp. 153–157, 1992.

R. Alur and G. Taubenfeld "How To Share An Object: A Fast Demo–Based Solution," Parallel and Distributed Processing 1993 Symplsium, pp. 470–477.

Reimer, L., "Image Formation in Low–Voltage Scanning Electron Microscopy", Tutorial Texts in Optical Engineering, vol. TT 12, SPIE Optical Engineering Press, Chap. 6.

Mellor–Crummey, J. M. et al, "Synchronization Without Contention", Proc. of the 4th Int'l Conf. on Arch. Support for Programming Languages and Operating Systems, (Apr., 1991).

Rudolph, L. et al, "A Simple Load Balancing Scheme for Task Allocation in Parallel Machines", Proc. of the 3rd ACM Symp. on Parallel Algorithms and Architectures, pp. 237–245 (1993).

Anderson, T., "The Performance of Spin Lock Alternatives for Shared–Memory Multiprocessors", IEEE Trans. on Parallel and Distr. Systems, 1(1):6–16 (Jan. 1990).

(List continued on next page.)

*Primary Examiner*—Lance Leonard Barry, Esq.
*Attorney, Agent, or Firm*—Mark M. Friedman

[57] ABSTRACT

A diffracting token router for executing a correctness invariant. The diffracting token router is connected to at least one producer of tokens and at least two consumers of tokens. The diffracting token router includes an array of inlet wires, an array of outlet wires, a diffracting prism connected to the array of inlet wires and the array of two outlet wires and a decision decider connected to the diffracting prism and the at least two outlet wires. The diffracting taken router has two operative modes. In its first operative mode, two or more tokens arrive at the diffracting prism in a diffracting collision manner according to the correctness invariant, and are thereafter routed to the array of output wires according to the correctness invariant. In its second operative made, one or more tokens arrive at the diffracting prism in a non-diffracting collision manner according to the correctness invariant, and are thereafter routed to the decision mechanism which routes them to the array of outlet wires according to the correctness invariant.

13 Claims, 10 Drawing Sheets

OTHER PUBLICATIONS

Shavit, N. et al, "Diffracting Trees" (1995), a preliminary version of which appeared in the Proc. of the Annual Symp. on Parallel Algorithms and Architectures (SPAA) (Jun. 1994).

Shavit, N et al, "Elimination Trees and the Construction of Pools and Stacks" (Feb. 1995).

Herlihy, M. et al, "Scalable Concurrent Counting", a preliminary version of which appeared in the Proc. of the 3rd Annual ACM Symp. on Parallel Algorithms and Architectures (Jul. 1992).

Aspnes, J. et al,: "Counting Networks", a preliminary version of which appeared in the Proc. of the 23rd ACM Symp. on the Theory of Computing, New Orleans (May 1991).

```
type balancer {
    size:    integer
    spin:    integer
    prism:   array [1..size] of integer
    lock:    boolean
    toggle:  boolean
    next:    array [0..1] of ptr to balancer
}
``` location: global array[1..NUMPROCS] of ptr to balancer function diff-bal(b: ptr to balancer): ptr to balancer /* phase 1 */

```
location[mypid] := b
place := random(1,b->size)
him := register_to_memory_swap(b->prism[place],mypid)
if not_empty(him) then
    if compare_and_swap(location[mypid],b,EMPTY) then
        if compare_and_swap(location[him],b,EMPTY) then
            return b->next[0]                               (a)
        else location[mypid] := b
    else return b->next[1]                                  (b)
endif
```

/* phase 2 */
```
forever
    repeat b->spin times
        if location[mypid] <> b then
            return b->next[1]                               (c)
    endrepeat
    if test_and_set(b->lock) then
        if compare_and_swap(location[mypid],b,EMPTY)
        then
            i := b->toggle
            b->toggle := not(i)
            unlock(b->lock)
            return b->next[i]                               (d)
        else
            unlock(b->lock)
            return b->next[1]                               (e)
        endif
    endif
endfor
```

FIG. 6

```
type balancer {
    size:   integer
    spin:   integer                        /* How long to wait    */
    prism:  array [1..size] of TID         /* prism processors    */
    toggle: TID                            /* toggle processor    */
    next:   array [0..1] of ptr to balancer /* left & right       */
}

/* send the message m to one of the prism processors of balancer b  */
dispatch_message(b: ptr to balancer, m: message)
{
    i = random(1,b->size)
    send_message(b->prism[i],m)
}

/* code for the toggling processor    */
ToggleProc {
    Vars
        ToggleBit: integer
    Code
        message = receive_messeage(BLOCK)
        dispatch_message(mybalancer->next[ToggleBit],message)
        ToggleBit = not(ToggleBit)
}

/* code for a prism processor    */
PrismProc {
    Code
        message0 = receive_message(BLOCK)
        message1 = receive_message(mybalancer->spin)
        if (message1 !=NULL) {
                /* perform diffraction    */
            dispatch_message(mybalancer->next[0],message0)
            dispatch_message(mybalancer->next[1],message1)
        }
        else   /* send to toggle         */
            send_message(mybalancer->toggle,message0)
}
```

FIG. 8

Location:    shared array[1..NUMPROCS];

Function TokenTraverse(b: ptr to balancer) returns (ptr to balancer or ELIMINATED);
   Location[mypid] := (b,TOKEN);

/* Part 1: attempt to collide with another token on k levels */ for i:=1 to k do
   place := random(1,size_i);
   him  := register_to_memory_swap(Prism_i[place],mypid);
   if not_empty(him) then
       (his_b,his_type) :=Location[him];
       if compare_and_swap(Location[mypid],(b,TOKEN), EMPTY) then
          if compare_and_swap(Location[him],(b,his_type), BY_TOKEN) then
            return (b->OutputWire[1] or ELIMINATED if his_type = ANTI-TOKEN)
          else
            Location[mypid] := (b,TOKEN);
       else
          return (b->OutputWire[0] or ELIMINATED if Location[mypid] = BY_ANTI_TOKEN)

/* Part 2 : wait to be collided with and otherwise toggle the bit */ repeat b->Spin times
       if Location[mypid] = BY_TOKEN then return b->OutputWire[0];
       if Location[mypid] = BY_ANTI_TOKEN then return ELIMINATED;
AcquireLock(b->TokenLock);
if compare_and_swap(Location[mypid],(b,TOKEN), EMPTY) then
       i:-b->TokenToggle;
       b->TokenToggle := Not(i);
       ReleaseLock(b->TokenLock);
       return b->OutputWire[i];
else
       ReleaseLock(b->TokenLock);
       return (b->OutputWire[0] or ELIMINATED if Location[mypid] = BY_ANTI_TOKEN)

FIG. 10A

Function AntiTokenTraverse(b: ptr to balancer) returns (ptr to balancer or ELIMINATED);
    Location[mypid] := (b,ANTI_TOKEN);

/* Part 1: attempt to collide with another token on k levels */ for i:=1 to k do
        place := random(1,size_i);
        him := register_to_memory_swap(Prism_i[place],mypid);
        if not_empty(him) then
            (his_b,his_type) := Location[him];
        if compare_and_swap(Location[mypid],(b,ANTI_TOKEN), EMPTY) then
            if compare_and_swap(Location[him],(b,his_type), BY_ANTI_TOKEN) then
                return (b->OutputWire[1] or ELIMINATED if his_type = TOKEN)
            else
                Location[mypid] := (b,TOKEN);
        else
            return (b->OutputWire[0] or ELIMINATED if Location[mypid] = BY_TOKEN)

/* Part 2: wait to be collided with and otherwise toggle the bit */ repeat b->Spin times
        if Location[mypid] = BY_ANTI_TOKEN then return b->OutputWire[0];
        if Location[mypid] = BY_TOKEN then return ELIMINATED;
AcquireLock(b->AntiTokenLock);
if compare_and_swap(Location[mypid],(b,ANTI_TOKEN), EMPTY) then
        i:= b->AntiTokenToggle;
        b->AntiTokenToggle := Not(i);
        ReleaseLock(b->AntiTokenLock);
        return b->OutputWire[i];
else
        ReleaseLock(b->AntiTokenLock);
        return (b->OutputWire[0] or ELIMINATED if Location[mypid] = BY_TOKEN)

FIG. 10B

Location:    shared array[1..NUMPROCS];

Function TokenTraverse(b: ptr to balancer) returns (ptr to balancer or ELIMINATED);
    Location[mypid] := (b,TOKEN);

/* Part 1: attempt to collide with another token on k levels */ for i:=1 to k do
    place := random(1,size_i);
    him   := register_to_memory_swap(Prism_i[place],mypid);
    if not_empty(him) then
            (his_b,his_type) := Location[him];
            if compare_and_swap(Location[mypid],(b,TOKEN), EMPTY) then
                if compare_and_swap(Location[him],(b,his_type), BY_TOKEN) then
                    return (b->OutputWire[1] or ELIMINATED if his_type =
                        ANTI-TOKEN)
            else
                Location[mypid] := (b,TOKEN);
        else
            return (b->OutputWire[0] or ELIMINATED if Location[mypid] =
                BY_ANTI_TOKEN)

/* Part 2: wait to be collided with and otherwise toggle the bit */ repeat b->Spin times
    if Location[mypid] = BY_TOKEN then return b->OutputWire[0];
    if Location[mypid] = BY_ANTI_TOKEN then return ELIMINATED;
AcquireLock(b->Lock);
if compare_and_swap(Location[mypid],(b,TOKEN), EMPTY) then
    i:= b->Toggle;
    b->Toggle := Not(i);
    ReleaseLock(b->Lock);
    return b->OutputWire[i];
else
    ReleaseLock(b->Lock);
    return (b->OutputWire[0] or ELIMINATED if Location[mypid] =
        BY_ANTI_TOKEN)

FIG. 12A

Function AntiTokenTraverse(b: ptr to balancer) returns (ptr to balancer or ELIMINATED);
    Location[mypid] := (b,ANTI_TOKEN);

/* Part 1: attempt to collide with another token on k levels */ for i:=1 to k do
        place := random(1,size_i);
        him   := register_to_memory_swap(Prism_i[place],mypid);
        if not_empty(him) then
                (his_b,his_type) := Location[him];
                if compare_and_swap(Location[mypid],(b,ANTI_TOKEN), EMPTY) then
                    if compare_and_swap(Location[him],(b,his_type), BY_ANTI_TOKEN) then
                        return (b->OutputWire[1] or ELIMINATED if his_type = TOKEN)
                    else
                        Location[mypid] := (b,TOKEN);
                else
                    return (b->OutputWire[0] or ELIMINATED if Location[mypid] =
                        BY_TOKEN)

/* Part 2: wait to be collided with and otherwise toggle the bit */ repeat b->Spin times
        if Location[mypid] = BY_ANTI_TOKEN then return b->OutputWire[0];
        if Location[mypid] = BY_TOKEN then return ELIMINATED;
AcquireLock(b->Lock);
if compare_and_swap(Location[mypid],(b,ANTI_TOKEN), EMPTY) then
        i:= b->Toggle;
        b->Toggle := Not(i);
        ReleaseLock(b->Lock);
        return b->OutputWire[Not(i)];
else
        ReleaseLock(b->Lock);
        return (b->OutputWire[0] or ELIMINATED if Location[mypid] = BY_TOKEN)

FIG. 12B

DIFFRACTING TOKEN ROUTER AND APPLICATIONS THEREOF

FIELD AND BACKGROUND OF THE INVENTION

The present invention relates to switching apparatus in general and in particular to applications of switching apparatus as shared counters, shared pools, shared stacks and the like in multi-processor environments.

As multi-processing breaks away from its traditional number crunching role, there is a growing need for highly distributed and parallel coordination structures which provide fast responses under both sparse and intense activity levels. Typical applications,include radar tracking systems, traffic flow controllers, communication exchange facilities, barrier synchronization, index distribution, shared program counters, concurrent data structures, dynamic load balancing and the like.

Up to the present time, shared counters, pools and stacks have been used to solve a variety of coordination and synchronization problems in a multi-processor environment. In its purest form, a counter is an object which holds an integer value and provides a fetch_and_increment operation, incrementing the counter and returning its previous value. While pools (also called piles, global pools, and producer/consumer buffers) are concurrent data-types which support the operations: enqueue (e) which adds the element e to the pool and dequeue (*) which deletes and returns some element (e) from the pool. And while stacks are pools with LIFO ordering.

The prior art teaches several approaches for implementing counters, the most con,non of which are surveyed in a paper entitled "Scalable Concurrent Counting" in the Proceedings of the 3rd Annual ACM Symposium on Parallel Algorithms and Architectures, July 1992, San Diego, Calif. which is incorporated herein by reference as if set forth fully herein.

One such approach is called "counting networks" which employs one input two output computing elements called "balancers". Intuitively, a balancer can be regarded as a toggle processor having a first operative state in which a token is routed to a first output wire and a second operative state in which a token is routed to a second output wire. Each passage of a token through a balancer switches the operative state of the balancer such that for a stream of tokens, a balancer repeatedly and alternately passes one token to its first output wire and one token to its second output wire, thereby effectively balancing the number of tokens that are output on its two output wires.

Balancers are typically interconnected to form a balancing binary tree having a width w equal to the total number of output wires of the tree. Balancing binary trees can be readily adapted to count the total number of tokens traversing therethrough by adding a "local counter" to each output wire i so that tokens outputting on wire i are consecutively assigned numbers i, i+4, i+(4*2), and so on. However, it is well known that balancing binary trees of the above construction suffer from the disadvantage that the root of the tree is prone to become a "hot-spot", causing a sequential bottleneck of tokens.

The literature offers a variety of pool implementations. On the one hand, there are queue-lock based solutions as described in a paper entitled "The Performance of Spin Lock Alternatives for Shared Memory Multi-processors" by Anderson, IEEE Transactions on Parallel and Distributed Systems, 1(1):6–16, January 1990 and a paper entitled "Synchronization without Contention" by J. M. Mellor-Crummey and M. L. Scott, Proceedings of the 4th International Conference on Architecture Support for Programming Languages and Operating Systems, April 1991. These solutions offer good performance under sparse access patterns but scale poorly since they offer little or no potential for parallelism in high load situations. On the other hand, there are simple and effective randomized work-pile techniques, for example, as described in a paper entitled "A Simple Load Balancing Scheme for Task Allocation in Parallel Machines" by Rudolph et al., Proceedings of the 3rd ACM Symposium on Parallel Algorithms and Architectures, pages 237–245, June 1993 that offer good expected response time under high loads but very poor performance as access patterns become sparse. Furthermore, the no randomized technique exists for implementing shared stacks.

There is thus a widely recognized need for, and it would be highly advantageous to have, apparatus overcoming the above-mentioned disadvantages of shared counters, shared pools, shared stacks and the like in multi-processor environments.

SUMMARY OF THE INVENTION

The present invention is for a diffracting token router for routing tokens from producers of tokens to consumers of tokens according to a correctness invariant, and applications thereof.

Hence, according to the teachings of the present invention, there is provided a diffracting token router for routing tokens according to a correctness invariant, the diffracting token router comprising: (a) an array of inlet wires; (b) an array of outlet wires; (c) at least one diffracting prism connected to at least one inlet wire of the array of inlet wires and at least two outlet wires of the array of outlet wires; and (d) a decision mechanism connected to the at least one diffracting prism and to the at least two outlet wires, the diffracting token router having: i) a first operative state in which two or more tokens arrive at the diffracting prism in a diffracting collision manner according to the correctness invariant, the diffracting prism routing the two or more tokens to the at least two output wires according to the correctness invariant, and ii) a second operative state in which one or more tokens do not arrive at the diffracting prism in a diffracting collision manner according to the correctness invariant, the diffracting prism routing the one or more tokens to the decision mechanism, thereafter the decision mechanism routing the one or more tokens to the at least two outlet wires according to the correctness invariant.

According to a further feature of the present invention, the correctness invariant varies the number of tokens required for a diffracting collision as a function of the throughput of tokens therethrough.

According to a still further feature of the present invention, a token waits a pre-determined spin time at the diffracting prism, the spin time being varied as a function of the throughput of tokens therethrough.

According to a yet still further feature of the present invention, the diffracting prism includes an array of at least two prism locations.

According to a yet still further feature of the present invention, each token randomly selects one of the at least two prism locations.

According to a yet still further feature of the present invention, the number of prism locations is varied as a function of the throughput of tokens therethrough.

There is also provided according to the teachings of the present invention, a device for satisfying the step property correctness invariant: $0 \leq Y_0' - Y_1' \leq 1$, the device comprising a diffracting token router having a diffracting prism and a decision mechanism, the diffracting prism connected to an inlet wire, a first outlet wire, and a second outlet wire, the diffracting token router having: i) a first operative state in which a pair of tokens arrive at the diffracting prism in a diffracting collision manner according to the correctness invariant, the diffracting prism routing one of the pair of tokens to the first outlet wire and the other of the pair of tokens to the second outlet wire, and ii) a second operative state in which one or more tokens do not arrive at the diffracting prism in a diffracting collision manner according to the correctness invariant, the diffracting prism routing the one or more tokens to the decision mechanism, thereafter the decision mechanism alternately routing one of the one or more tokens to the first outlet wire and one of the one or more tokens to the second outlet wire.

According to a further feature of the present invention, a shared counter implemented as a binary tree of diffracting token routers in which the output wires of the binary tree are connected to local counters.

According to a still further feature of the present invention, a shared counter implemented as a counting network of diffracting token routers in which the output wires of the counting network are connected to local counters.

There is further provided according to the teachings of the present invention, a device accessed by tokens T and antitokens AT for satisfying the pool balancing property correctness invariant for output wires "0" and "1": in the quiescent state, if $X' \geq X^{at}$, then $Y_0' \geq Y_0^{at}$, and $Y_1' \geq Y_1^{at}$, the device comprising a diffracting token router having a diffracting prism and a decision mechanism having a token toggle bit and an antitoken toggle bit, the diffracting prism connected to an inlet wire, a first outlet wire, and a second outlet wire, the diffracting token router having: i) a first operative state in which a pair of tokens arrive at the diffracting prism in a diffracting collision manner according to the correctness invariant, the diffracting prism routing one of the pair of tokens to the first outlet wire and the other of the pair of tokens to the second outlet wire, ii) a second operative state in which a pair of antitokens arrive at the diffracting prism in a diffracting collision manner according to the correctness invariant, the diffracting prism routing one of the pair of antitokens to the first outlet wire and the other of the pair of antitokens to the second outlet wire, iii) a third operative state in which a pair of a token and an antitoken arrive at the diffracting prism in a diffracting collision manner according to the correctness invariant, the token and antitoken eliminating one another, iv) a fourth operative state in which one or more tokens do not arrive at the diffracting prism in a diffracting collision manner according to the correctness invariant, the diffracting prism routing the one or more tokens to the token toggle bit, thereafter the token toggle bit alternately routing one of the one or more tokens to the first outlet wire and one of the one or more tokens to the second outlet wire, and v) a fifth operative state in which one or more antitokens do not arrive at the diffracting prism in a diffracting collision manner according to the correctness invariant, the diffracting prism routing the one or more antitokens to the antitoken toggle bit, thereafter the antitoken toggle bit alternately routing one of the one or more antitokens to the first outlet wire and one of the one or more antitokens to the second outlet wire.

According to a further ligature of the present invention, a shared pool implemented as a binary tree of diffracting token routers in which the output wires of the binary tree are connected to local pools.

There is still further provided according to the teachings of the present invention, a device accessed by tokens T and antitokens AT for satisfying the gap step property correctness invariant for output wires "0" and "1": in the quiescent state, $0 \geq (Y_0' - Y_0^{at}) - (Y_1' - Y_1^{at}) \leq 1$, the device comprising a diffracting token router having a diffracting prism and a decision mechanism having a toggle bit, the diffracting prism connected to an inlet wire, a first outlet wire, and a second outlet wire, the diffracting token router having: i) a first operative state in which a pair of tokens arrive at the diffracting prism in a diffracting collision manner according to the correctness invariant, the diffracting prism routing one of the pair of tokens to the first outlet wire and the other of the pair of tokens to the second outlet wire, ii) a second operative state in which a pair of antitokens arrive at the diffracting prism in a diffracting collision manner according to the correctness invariant, the diffracting prism routing one of the pair of antitokens to the first outlet wire and the other of the pair of antitokens to the second outlet wire, iii) a third operative state in which a pair of a token and an antitoken arrive at the diffracting prism in a diffracting collision manner according to the correctness invariant, the token and antitoken eliminating one another, iv) a fourth operative state in which one or more tokens do not arrive at the diffracting prism in a diffracting collision manner according to the correctness invariant, the diffracting prism routing the one or more tokens to the decision mechanism, thereafter the decision mechanism routing one of the one or more tokens either to the first outlet wire or to the second outlet wire according to the previous value of the toggle bit, and v) a fifth operative state in which one or more antitokens do not arrive at the diffracting prism in a diffracting collision manner according to the correctness invariant, the diffracting prism routing the one or more antitokens to the decision mechanism, thereafter the decision mechanism routing one of the one or more antitokens either to the first outlet wire or to the second outlet wire according to the updated value of the toggle bit.

According to a further feature of the present invention, a shared stack implemented as a binary tree of diffracting token routers in which the output wires of the binary tree are connected to local stacks.

BRIEF DESCRIPTION OF THE DRAWINGS

The invention is herein described, by way of example only, with reference to the accompanying drawings, wherein:

FIG. 6 is code for the shared memory implementation of FIG. 5;

FIG. 8 is code for the message passing implementation of FIG. 7;

FIG. 10, comprising FIGS. 10 and 10b, is code used in the shared memory implementation of FIG. 9;

FIG. 12, comprising FIGS. 12a and 12b, is code used in the shared memory implementation of FIG. 11.

DESCRIPTION OF THE PREFERRED EMBODIMENTS

Figure 1:
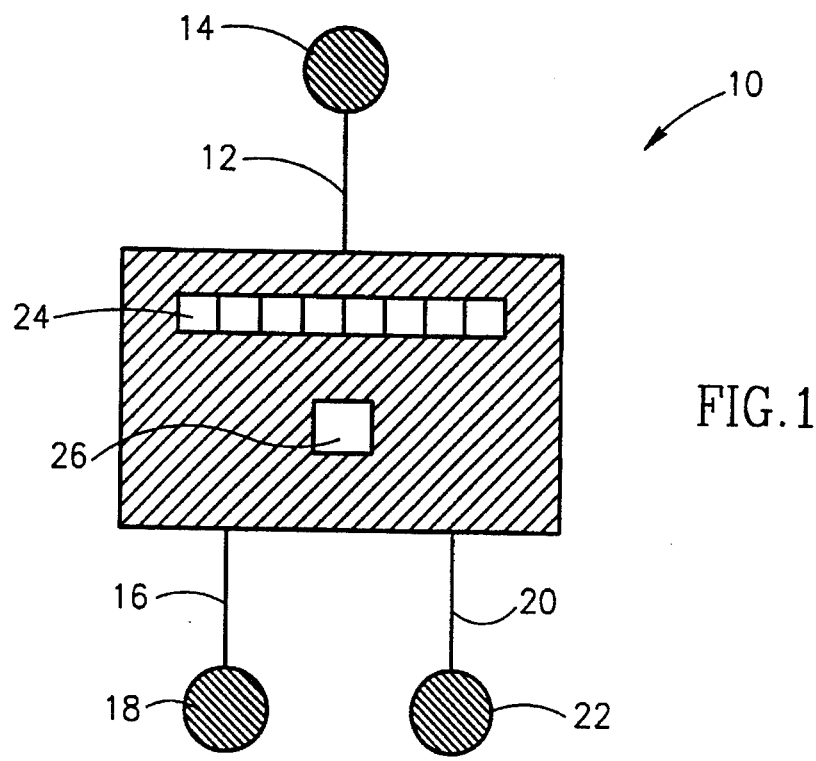
FIG. 1 is a schematic depiction of a diffracting token router having a single input wire and two output wires constructed and operative according to the teachings of the present invention.

The present invention is of a diffracting token router for routing tokens from producers of tokens to consumers of tokens according to a correctness invariant, and applications thereof.

The principles and operation of apparatus according to the present invention may be better understood with reference to the drawings and the accompanying description.

Briefly stated, a diffracting token router of the present invention is a switching apparatus for routing tokens from producers of tokens to consumers of tokens according to a correctness invariant. Throughput of tokens through the diffracting token router is improved by first attempting to collide tokens in diffracting collisions at one or more diffracting prisms which "diffract" or route collided tokens to consumers according to the correctness invariant. Only tokens which do not successfully collide in a diffracting collision are passed to a decision mechanism for routing to consumers according to the correctness invariant. The motivation behind the diffracting prism is to reduce contention on the decision mechanism, thereby increasing throughput of tokens through a diffracting token router.

Dictionary of Terms

For the sake of clarity, commonly used terms in the following description of the present invention and their definitions are as follows:

a) Diffracting Token Router "DTR"—A diffracting token router is, in effect, a switching apparatus for routing tokens from producers of tokens to consumers of tokens according to a correctness invariant. A DTR includes one or more diffracting prisms and a decision mechanism. One or more DTRs can be interconnected to form a wide range of networks. Typical configurations of DTRs include, but are not limited to, balancing binary trees, counting networks, and the like.

b) Token—A token is an object for routing through a network of one or more DTRs. A token can be imagined to be the flow control of a computer program, a communication packet, and the like. It should be noted that the passage of a token through a DTR is independent of the passage of other tokens through the DTR notwithstanding that its routing can depend on the memory of other tokens which have previously passed through the DTR or the network.

c) Correctness Invariant—A correctness invariant is an axiom which determines the behavior of a diffracting token router according to a particular application. In other words, the correctness invariant determines the relation between the outgoing tokens as a function of the incoming tokens.

d) Operating Policy—An operating policy determines the routing of tokens through a DTR, the one or more diffracting collisions at a diffracting prism, the duration of a spin time of a token at a diffracting prism, instructions for dynamically modifying parameters of the diffracting token router according to the throughput of tokens therethrough, and the like.

e) Producer of Tokens—A producer of tokens is a processor or a process which produces tokens. It should be noted that only a producer of tokens can produce tokens, in other words, a DTR can never create tokens.

f) Consumer of Tokens—A consumer of tokens is a processor or process which consumes tokens.

g) Diffracting Prism—Generally speaking, a diffracting prism is a mechanism for enabling tokens to collide in diffracting collisions and thereafter be routed to consumers of tokens according to the correctness invariant. A diffracting prism can include one or more prism locations for increasing the parallelism of the handling of tokens thereat. Any tokens which did not collide in a diffracting collision are passed to the decision mechanism of the DTR.

h) A Decision Mechanism—A decision mechanism is a mechanism for routing non-diffracted tokens according to the correctness invariant.

i) Quiescent State—The quiescent state of a DTR is the state in which all the tokens which have arrived thereat have passed therethrough. It should be noted that some tokens can take longer than others to pass through a diffracting token router. In other words, although the tokens are handled on a first come first served basis, the output of tokens is not necessarily on a First In First Out (FIFO) basis.

In the quiescent state, we denote the number of tokens of type T which enter a DTR along an input wire i as $X_i^T$. Similarly, we denote the number of tokens T which exit a DTR along an output wire i as $Y_i^T$.

j) Spin Time—A spin time is an interval of time that a token waits at a diffracting prism so as to be collided with one or more other tokens in a diffracting collision.

k) Binary Tree—A binary tree with w output wires denoted BIN[w] is designed in the following way. When w is a power of 2, BIN[2*k] is a root node connected to two BIN[k] trees with the output wires $Y_0$, $Y_1 \ldots Y_{k-1}$ of the tree hanging on the left side of the root redesignated as the even output wires $Y_0, Y_2 \ldots Y_{2k-2}$ of BIN[2*k] while the output wires $Y_0, Y_1, \ldots Y_{k-1}$ of the tree hanging on the right side of the root redesignated as the odd output wires $Y_1, Y_3 \ldots Y_{2k-1}$ of BIN[2*k].

l) Local Counter, Local Pool and Local Stack—The term "local" refers to the fact that the component is protected by a lock and therefore can only be accessed sequentially.

Implementations of a Diffracting Token Router

Generally speaking, a diffracting token router of the present invention can be realized in one of three implementations as follows:

a) a hardwired device;

b) a shared data structure in a shared memory multi-processor environment; and c) one or more processors or processes in a message passing multi-processor environment.

Hardwired Implementation of a Diffracting Token Router

The construction and operation of a hardwired implementation of a diffracting token router, generally designated 10, of the present invention is now described with reference to FIG. 1. For the sake of clarity, the most basic configuration of a diffracting token router for routing tokens from a single producer of tokens to two consumers of tokens, referred to as a left consumer and a right consumer, is now described.

Diffracting token router 10 includes an input wire 12 connected to producer of tokens 14 and two output wires 16 and 20 connected to left consumer of tokens 18 and right consumer of tokens 22, respectively. Furthermore, diffracting token router 10 includes a diffracting prism 24 and a decision mechanism 26. Diffracting prism 24 is connected to input wire 12 and output wires 16 and 20 whereas decision mechanism 26 is connected to diffracting prism 24 and output wires 16 and 20.

Diffracting prism 24 preferably includes an array of prism locations denoted $1_1, 1_2, \ldots 1_8$ so as to increase parallelism in the handling of tokens thereat. A token typically selects one of the prism locations $1_1, 1_2, \ldots 1_8$ at random and waits the spin time as determined by the operating policy governing the operation of diffracting token router 10.

It can be readily appreciated that the number of prism locations in diffracting prism 24 and the "spin time" of the tokens at diffracting prism 24 influence the throughput of tokens through diffracting token router 10. The operating policy preferably dynamically modifies the number of prism locations in diffracting prism 24 and the spin time of tokens so as to optimize the throughput of tokens through diffracting token router 10.

It can be readily appreciated that the number of prism locations in diffracting prism 24 effects the chance of a successful diffracting collision between tokens. If the number of prism locations is too high, then tokens will tend to miss each other, thereby causing contention at decision mechanism 26 and so reducing throughput of tokens through diffracting token router 10. In the case that the number of prism locations is too low, contention will occur at diffracting prism 24 as too many tokens try to access too few prism locations, thereby once again reducing throughput of tokens through diffracting token router 10.

Turning now to the spin time of tokens at diffracting prism 24, if the spin time is too short, then a token at a prism location is not available for a sufficient length of time to enable a diffracting collision, thereby causing contention at decision mechanism 26 and so reducing the throughput of tokens through diffracting token router 10. In the case that the spin time is too long, then the tokens will tend to wait too long at diffracting prism 24, thereby causing a degradation in performance of diffracting token router 10.

Figure 2:
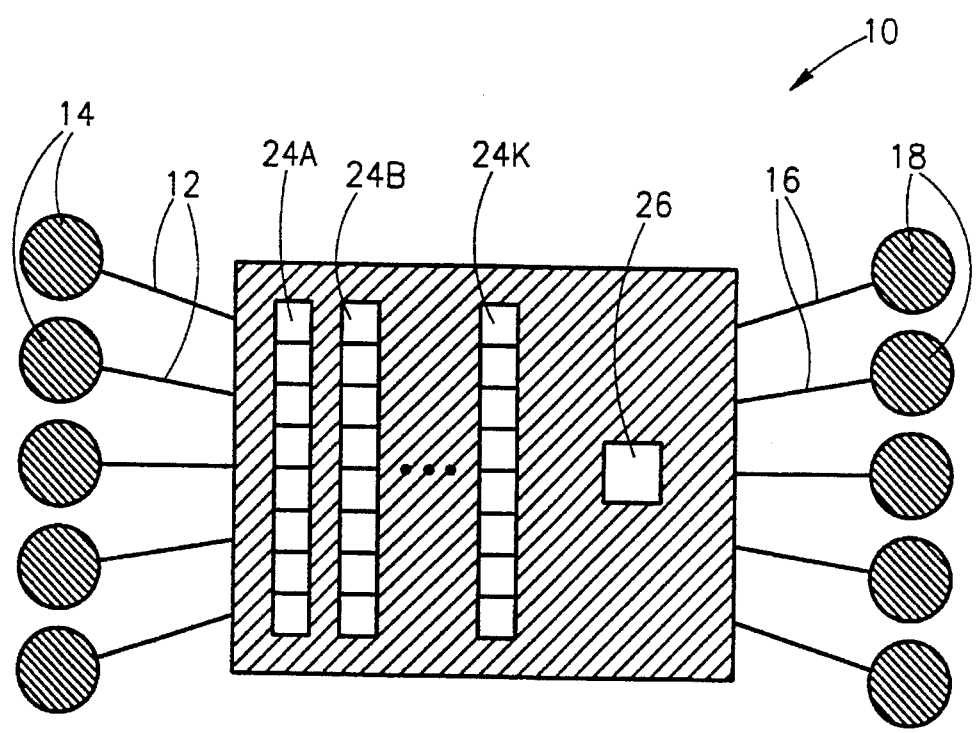
FIG. 2 is a schematic depiction of a diffracting token router having n input wires and m output wires constructed and operative according to the teachings of the present invention.

A more generalized configuration of diffracting token router 10 is depicted in FIG. 2. As can be clearly seen, diffracting token router 10 can include one or more diffracting prisms 24a, 24b, ... 24k, n input wires 12 connected to producers of tokens 14 and m output wires 16 connected to consumers of tokens 18. As before, a token only arrives at decision mechanism 26 if it is not diffracted in any one of diffracting prisms 24a, 24b, ... 24k.

Shared Data Structure Implementation of a Diffracting Token Router in a Shared Memory Multi-processor Environment In this case, a diffracting token router of the present invention is realized as a record, an output wire is realized as a pointer from one record to another record and a token is in effect the flow control of a program traversing the data structure. In such an environment, each of a machine's asynchronous processors runs a program that repeatedly traverses the data structure from some input pointer to some output pointer, each time shepherding a new "token" through the data structure.

Processor or Process Implementation of a Diffracting Token Router in a Message Passing Multi-processor Environment In this case, a token is implemented as a message, a diffracting token router is implemented as a processor or a process that receive messages and sends them to destinations in a co-ordinated fashion, and an output wire is in effect a set of thread identifiers (TIDs) to which messages are sent. It should be noted that the motivation behind this implementation is to allocate each part of a DTR, for example, the various prism locations and the decision mechanism, in a different processor or process so as to distribute the load between a number of processors or processes.

Applications of Diffracting Token Routers

The diffracting token router of the present invention is described with respect to three basic applications without in any way limiting the scope of the present invention. The applications described hereinbelow are as follows:

a) a shared counter, b) a shared pool, and c) a shared stack.

A Shared Counter

Briefly stated, a shared counter returns an integer value to any number of devices requesting an integer value and incrementing the integer value after each such request. As is well known in the art, a device which satisfies the step property: in the quiescent state, $0 \leq Y_i' - Y_j' \leq 1$ where $i < j$ can be used to implement a shared counter when a "local counter" is connected to an output wire i, thereby providing the sequence of numbers i, i+4, i+(4*2), ...

Given a binary tree of DTRs, if each DTR 10 fulfills the correctness invariant $0 \leq Y_0' - Y_1' \leq 1$ between output wires 16 and 20 in its quiescent state, then the binary tree satisfies the above step property. In practice, this is achieved by diffracting token router 10 repeatedly and alternately routing incoming tokens to left and right consumers 18 and 22, respectively.

Hence, a diffracting collision between incoming tokens occurs at diffracting prism 24 when a pair of tokens arrive thereat within a pre-determined spin time. Thereafter one of the diffracted tokens is routed to left consumer 18 and the other diffracted token is routed to right consumer 22. Moreover, the correctness invariant requires that decision mechanism 26 has two operative states: in the first operative state, a token is routed to left consumer 18 whereas in the second operative state, a token is routed to right consumer 22. It should be noted that each passage of a token through decision mechanism 26 switches decision mechanism 26 from either its first operative state to its second operative state or from its second operative state to its first operative state.

For the sake of an example, assume that diffracting prism 24 has two prism locations $1_0$ and $1_1$, tokens have a spin time of five clock cycles, and tokens $T_1, T_2, T_3$ and $T_4$ arrive at diffracting prism 24 in the following fashion: Token $T_1$, arrives at clock cycle $C_0$ and selects prism location $1_0$. Token $T_2$ arrives at clock cycle $C_3$ and selects prism location $1_1$. Token $T_3$ arrives at clock cycle $C_4$ and selects prism location $1_1$. And lastly, token $T_4$ arrives at clock cycle $C_6$ and selects prism location $1_0$.

Since token $T_3$ arrived at the same prism location as token $T_2$, namely prism location $1_1$, within the 5 clock cycle spin time of token $T_2$, tokens $T_2$ and $T_3$ participate in a diffracting collision at diffracting prism 24. Thus, token $T_2$ and token $T_3$ are diffracted to left consumer 18 and right consumer 22, respectively.

Thereafter, diffracting prism 24 passes token $T_1$ to decision mechanism 26 after the spin time of 5 clock cycles because no other token arrived at location $1_0$ within this time frame so as to enable a diffracting collision. Assuming that decision mechanism 26 has assumed its second operative state, then token $T_1$ is routed to right consumer 22 after switching decision mechanism 26 to its first operative state.

Thereafter, diffracting prism 24 passes token $T_4$ to decision mechanism 26 because when token $_4$ arrived prism location $1_0$, it had already been vacated by token $T_1$. In this case, decision mechanism 26 routes token $T_4$ to left consumer 18 after being switched to its second operative state so as to fulfill the correctness invariant.

Figure 3:
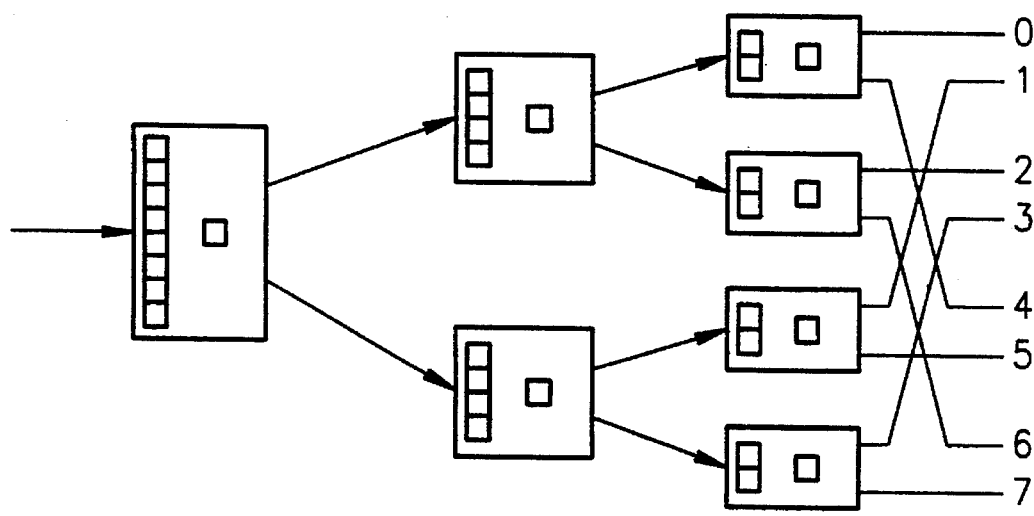
FIG. 3 is a schematic depiction of an eight output wire shared counter implemented by diffracting token routers of FIG. 1.
Figure 4:
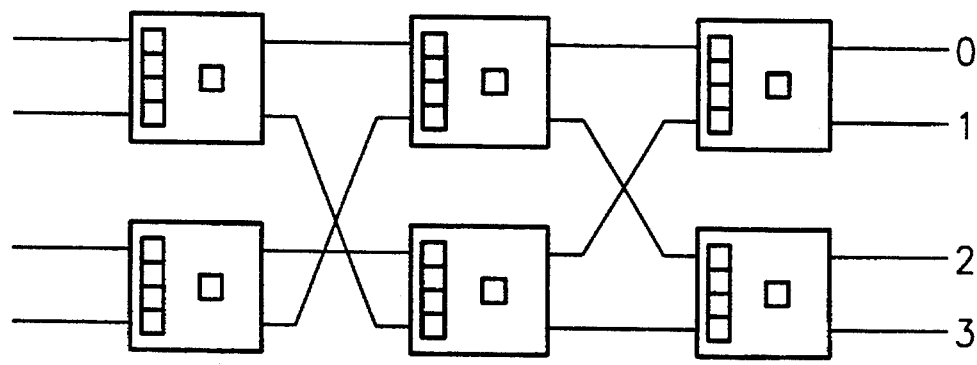
FIG. 4 is a schematic depiction of a four output wire shared counter implemented by diffracting token routers of FIG. 1.

Turning briefly to FIGS. 3 and 4, a number of diffracting token routers 10 can be interconnected to form shared counters of greater width. In FIG. 3, seven diffracting token routers 10 have been interconnected to provide a balancing binary tree having 8 output wires satisfying the step property. Whereas, in FIG. 4, six diffracting token routers 10 have been interconnected to provide a counting network having four output wires which satisfy, the step property.

It should be noted that diffracting prisms 24 of diffracting token routers 10 of the balancing binary tree of FIG. 3 have different numbers of prism locations. As can be seen, the diffracting token router at the root of the balancing binary tree typically has the most prism locations while the diffracting token routers at the leaves of the balancing binary tree typically have the least number of prism locations. This is because the diffracting token router at the root of the balancing binary tree is required to handle all the tokens passing through the shared counter while the diffracting token routers at the leaves of the balancing binary tree only have to handle a portion, in this case a quarter, of the tokens passing through the shared counter.

Figure 5:
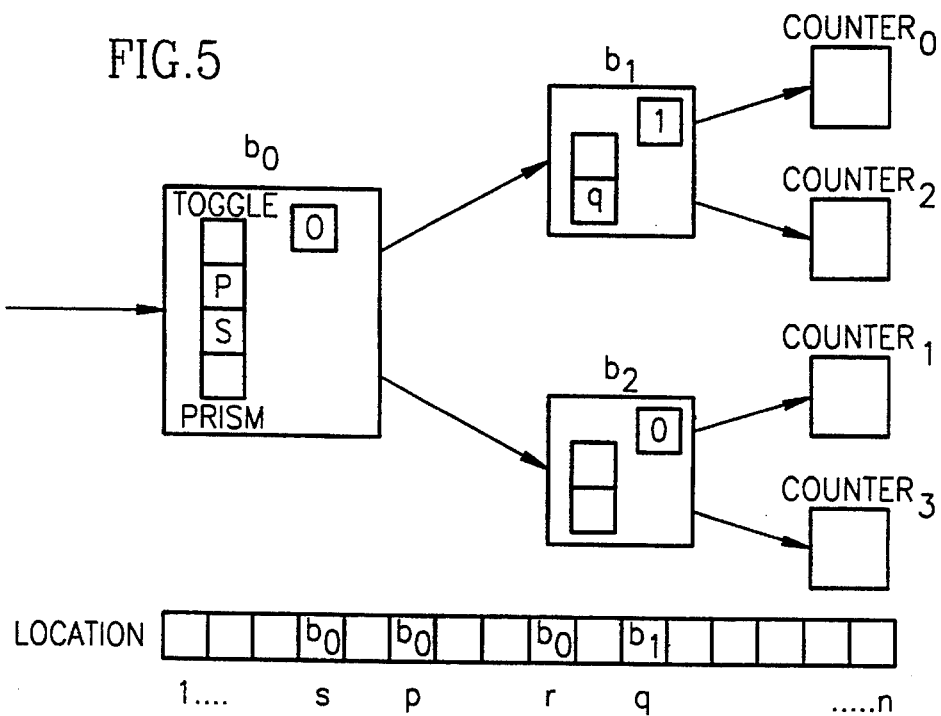
FIG. 5 is a schematic depiction of a shared counter implemented by diffracting token routers in a shared memory environment.

With reference now to FIGS. 5 and 6, a shared memory implementation of a shared counter employs diffracting token routers realized as a binary tree of DTR records. Each processor or process p that wishes to increment the shared counter, shepherds a token through the binary tree by executing a program that reads and writes to shared memory. Each DTR record b includes a prism array and a decision mechanism implemented as a toggle bit. The prism array contains the Process Identifiers (PIDs) of processes p which are passing through the DTR.

This implementation also requires an additional global array location which includes an element location [p] per process p for holding the address addr of the DTR record h which process p is currently traversing. As will become clearer hereinbelow, the global array location is used to enable synchronization between potentially colliding tokens. In practice, a diffracting collision between tokens of processes p and q can only occur when the elements location [p] and location [q] contain the same DTR address b.

The implementation uses the following primitives:

1) register$_{13}$to$_{13}$memory$_{13}$swap (addr,val) for writing a value val to address addr and returning address's addr previous value;

2) compare$_{13}$and$_{13}$swap (addr, old, new) for checking if the value at the address addr is equal to old, and if so, replacing it with new, returning TRUE, otherwise, the primitive just returns FALSE; and 3) test$_{13}$and$_{13}$set (addr) for writing TRUE to address addr and returning the previous value.

The primitives can be implemented in a lock-free manner using the fashionable load-linked/store-conditional operations available on standard architectures.

The code translates into the following sequences of operations performed by a process shepherding a token through a DTR. First, in phase I, process p announces the arrival of its token at DTR b by writing the address of the DTR b at location [p]. Using the instruction random (a,b), process p randomly selects a location in the prism array and employs the register$_{13}$to$_{13}$memory$_{13}$swap primitive to swap its own Process Identifier (PID) for the value written there.

Assuming that process p has read the PID of an existing process q, process p attempts to diffract with process q. This diffraction can only be accomplished by performing two consecutive compare$_{13}$and$_{13}$swap operations on the location array successfully. The first operation attempts to clear the address b in location [p], thereby ensuring that no other process can collide with it and so avoiding race conditions. The second operation attempts to clears the address b in location [q], thereby ensuring that process q is diffracted together with process p. If both compare$_{13}$and$_{13}$swap operations succeed, the diffraction is successful, and process p is diffracted to the b->next[0] DTR and process q is diffracted to the b->next[1 ] DTR.

the first compare$_{13}$and$_{13}$swap operation fails, it follows that some other process r has already managed to diffract process p. In this case, process r was diffracted to the b->next[0] DTR and process p is diffracted to the b->next[1] DTR.

the first compare$_{13}$and$_{13}$swap operation succeeds but the second compare$_{13}$and$_{13}$swap operation fails, it follows that process q with which process p was trying to collide is no longer available. In this case, process p re-announces the arrival of its token at DTR b by writing the address of the DTR b at location [p] again.

Thereafter, in the event that process p did not participate in a diffracting collision, as shown in phase 2, process p spins spin times so as to give another process the chance to collide with it. Should a process s successfully collide with process p during the spinning of process p, then process s is diffracted to the b->next[0] DTR and process p is diffracted the b->next[1] DTR.

After the spin time, process p attempts to seize the toggle bit using the test$_{13}$and$_{13}$set operation. If the toggle bit could not be seized, the process p remains spinning. If the test $_{13}$and$_{13}$set operation was successful, process p clears location [p], using the compare$_{13}$and$_{13}$swap operation, and then toggles the toggle bit and exits the DTR according to the previous value of the toggle bit. However, if the compare$_{13}$and$_{13}$swap operation fails, it follows that process p has been collided with and diffracted to the b->next[1] DTR. Therefore, process p leaves the DTR without changing the toggle bit.

All in all, the construction ensures that for every process p being diffracted to the b->next[1] DTR, there is exactly one process being diffracted to the b->next[0] DTR and the step property is maintained.

Figure 7:
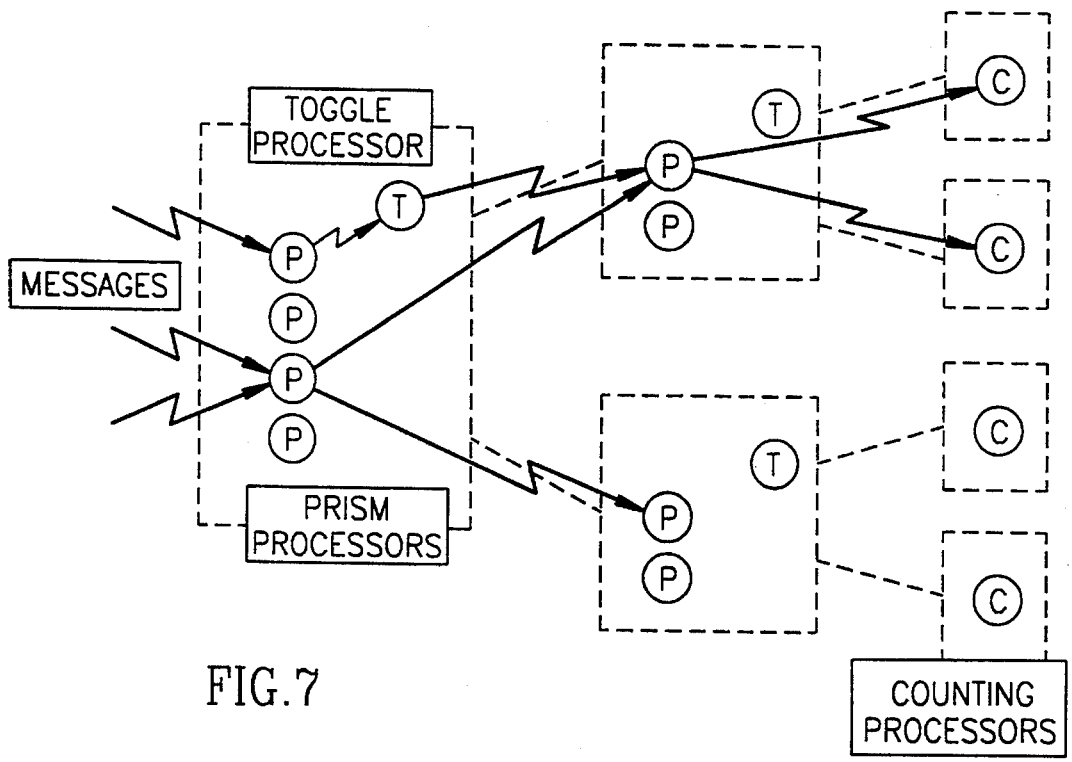
FIG. 7 is a schematic depiction of a shared counter implemented by diffracting token routers in a message passing environment.
Figure 9:
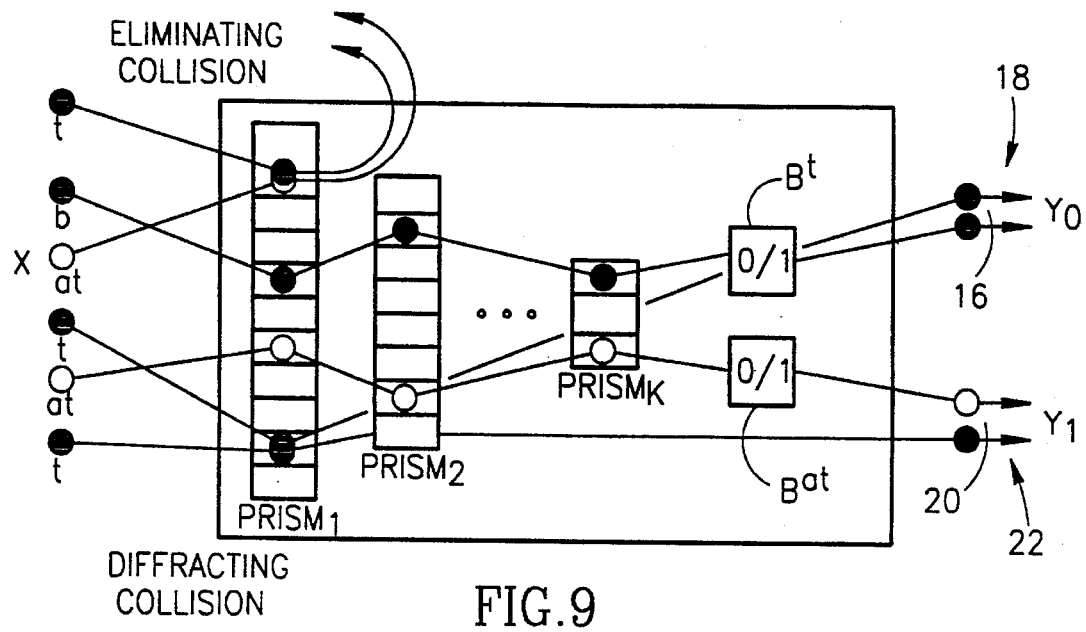
FIG. 9 is a schematic depiction of a diffracting token router used in a shared pool implementation.
Figure 11:
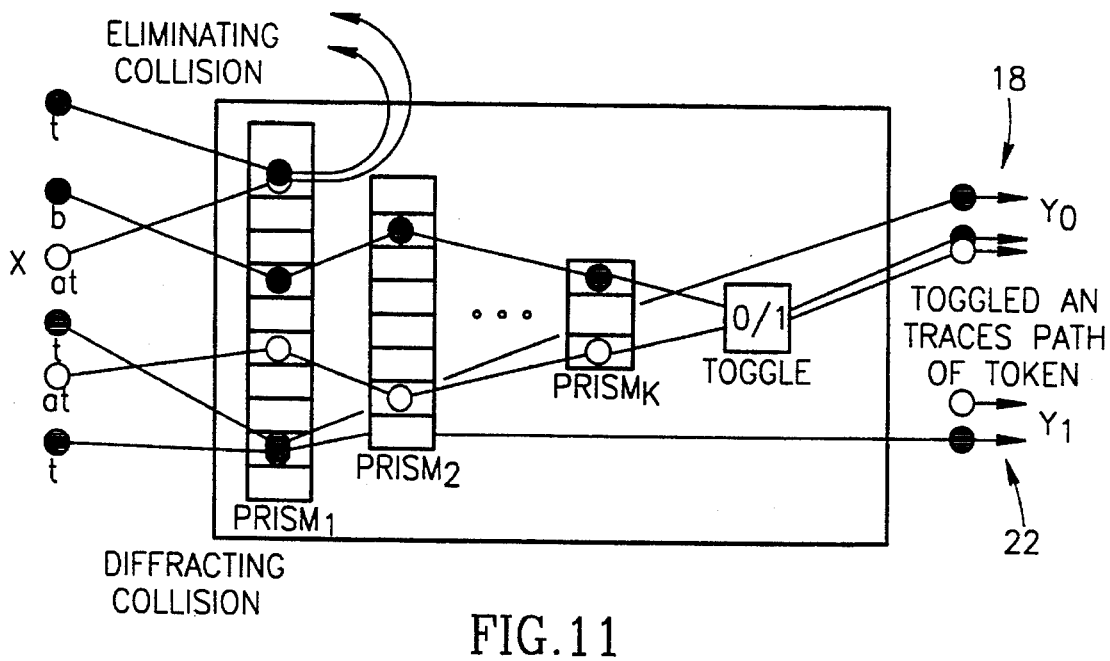
FIG. 11 is a schematic depiction of a diffracting token router used in a shared stack implementation.

With reference now to FIGS. 7 and 8, a message passing implementation of a shared counter employing diffracting token router is now described. Briefly stated, in this implementation, a DTR includes a collection of prism threads and a toggle thread.

The implementation uses the following primitives:

1) receive$_{13}$message (s) waits for a message m to arrive within a pre-determined spin time of s cycles. If a message m arrives, the primitive returns the content of message m. If no message m arrives after s cycles, a NULL is returned. If s has the special value "BLOCK", the primitive waits indefinitely for a message m to arrive;
2) send$_{13}$message (t,m) sends a :message m to a thread t;
3) dispatch$_{13}$message (b,m) for sending a message m to a randomly chosen prism thread of DTR b.

The code translates into the following sequence of operations:

A prism thread employs the receive$_{13}$message primitive assigned the value of BLOCK to wait until a first message m arrives. Thereafter, the prism thread employs the receive$_{13}$message primitive assigned with the value of spin to delay the message m for a fixed number of cycles to allow another token (message) to arrive. If another token arrives within the pre-determined spin time, the prism thread employs the dispatch$_{13}$message primitive to diffract the two tokens, forwarding one message to the left DTR and the other message to the right DTR.

If another token did not arrive during this interval, the prism thread employs the send$_{13}$message primitive to forward the token to the toggle thread of the DTR used for forwarding the message m to an output wire depending on its former value. The toggle thread employs the receive$_{13}$message primitive assigned the value of BLOCK to wait until a message arrives. The thread toggles the toggle bit on arrival of the message and thereafter employs the dispatch$_{13}$message primitive to forward the message to either the left output wire or the right output wire according to toggle bit's former value.

In summary, it can be readily understood that the shared counter as implemented according to the teachings of the present invention, on the one hand, behaves as a centralized counter in the sense that it ensures that the numbers provided by the shared counter are consecutive while, on the other hand, it behaves as a distributed counter in the sense that there is no contention on any one particular counter.

A Shared Pool

Briefly stated, a shared pool is a concurrent object which supports the operations: enqueue(e) which adds element e to the pool and dequeue(*) which deletes and returns some element e from the pool. Furthermore, a pool is required to satisfy the following two conditions: First, that an enqueue operation also succeeds. And second, that a dequeue operation succeeds if the pool is not empty. In other words, a dequeue operation succeeds when the number of completed enqueue operations is greater than or equal to dequeue operations. A successful operation is one which is guaranteed to return a response within finite time.

It should be noted that the DTR employed in a shared pool implementation differs from the DTR of the shared counter implementation in three respects:

First, a diffracting token router is designed to handle two types of tokens: a token type denoted t for performing an enqueue operation and an antitoken type denoted at for performing a dequeue operation. A shared pool is implemented as a binary tree of DTRs which has each of its output wires connected to a local pool. This binary tree must satisfy the pool balancing property: in the quiescent state, if $X^t \geq X^{at}$, then for every output wire i carrying a local pool, $Y_i^t \geq Y_{iat}$. It can be shown that in the case that each DTR satisfies this pool balancing property, then the binary tree satisfies the pool balancing property too.

Thus, an enqueue operation is performed by shepherding a token "carrying" the enqueued value down the tree. If the token reaches an output wire, the enqueued value carried thereby is added to the local pool connected to that output wire. The dequeue operation is similarly performed by shepherding an antitoken down the tree. If this antitoken collides with a token within the tree, the dequeue operation returns the enqueued value carried by the token to the producer of the antitoken. Otherwise, the antitoken exits on one of the output wires and performs the dequeue operation on the local pool connected to the output wire. In the case that a local pool is empty, an antitoken will wait until such time that a token arrives at which time the antitoken will return the enqueued value of the token.

Second, that there are three possible types of diffracting collisions at a diffracting prism due to the use of tokens and antitokens. These diffracting collisions types are as follows: First, a token-token collision in which one of the tokens is passed to left consumer 18 and the other token is passed to right consumer 22. Second, an antitoken-antitoken collision in which one of the antitokens is passed to left consumer 18 and the other antitoken is passed to right consumer 22. And lastly, a token-antitoken collision in which the token and the antitoken "eliminate" each other by transferring the enqueued value from the token to the antitoken. In other words, the token and the antitoken which participate in a token-antitoken collision are not output on output wires 16 and 20. Alternatively, they can be output to a dummy output wire which is not connected within the binary tree.

And lastly, the DTR includes a decision mechanism having a toggle bit denoted $B_t$ dedicated to handling tokens and an antitoken toggle bit denoted $B^{at}$ for handling antitokens. Toggle bit $B^t$ alternately and repeatedly routes tokens to left and right consumers respectively depending on the former value of the toggle bit $B^t$. And in a similar fashion, toggle bit $B^{at}$ alternately and repeatedly routes antitokens to the left and right consumers respectively depending on the former value of the toggle bit $B^{at}$.

It should be noted that in order to improve the throughput of tokens and antitokens through a shared pool, a DTR preferably includes a number of diffracting prisms connected in series. Typically, the first diffracting prism encountered by incoming tokens and antitokens has more prism locutions that the last diffracting prism adjacent to the decision mechanism.

For the sake of example, assume that there is a single diffracting prism 24 having three prism locations $1_0$, $1_1$ and $1_2$, tokens and antitokens have a spin time of five clock cycles, and tokens $T_1$–$T_5$ and antitokens $AT_1$–$AT_5$ arrive at diffracting prism 24 in the following fashion:

Token $T_1$ arrives at clock cycle $C_0$ and selects prism location $1_0$. Antitoken $AT_1$ arrives at clock cycle $C_1$ and selects prism location $1_1$. Antitoken $AT_2$ arrives at clock cycle $C_2$ and selects prism location $1_1$. Token $T_2$ arrives at clock cycle $C_3$ and selects prism location $1_2$. Token $T_3$ arrives at clock cycle $C_4$ and selects prism location $1_0$. Antitoken $AT_3$ arrives at clock cycle $C_5$ and selects prism location $1_1$. Antitoken $AT_4$ arrives at clock cycle $C_6$ and selects prism location $12_1$. Token $T_4$ arrives at clock cycle $C_7$ and selects prism location $1_0$. Antitoken $AT_5$ arrives at clock cycle $C_{12}$ and selects prism location $1_1$. Token $T_5$ arrives at clock cycle $C_{17}$ and selects prism location $1_0$.

At clock cycle $C_4$, a diffracting collision occurs between antitokens $AT_1$ and $AT_2$ at prism location $1_1$ such that antitoken $AT_1$ is passed to left consumer 18 while antitoken $AT_2$ is passed to right consumer 22.

At clock cycle $C_5$, a diffracting collision occurs between tokens $T_1$ nd $T_3$ at prism location $1_0$ such that token $T_1$ is passed to left consumer 18 while token $T_3$ is passed to right consumer 22.

At clock cycle $C_7$, a diffracting collision occurs between token $T_2$ and $AT_4$ at prism location $1_2$ such that token $T_2$ and antitoken $AT_4$ are both eliminated. In this case, antitoken $AT_4$ returns the enqueued value carried by token $T_2$.

At clock cycle $C_{11}$, antitoken $AT_3$ after waiting at prism location $1_1$ tier 5 clock cycles, is passed to toggle bit $B^{at}$. Thereafter, assuming that toggle bit $B^{at}$ is in its first operative state, antitoken $AT_3$ is routed to left consumer 18.

At clock cycle $C_{13}$, token $T_4$ after waiting at prism location $1_0$ for 5 clock cycles, is passed to toggle bit $B^t$. Thereafter, assuming that toggle bit $B^t$ is in its first operative state, token $T_4$ is routed to left consumer 18.

At clock cycle $C_{18}$, antitoken $AT_5$ after waiting at prism location $1_1$ for 5 clock cycles, is passed to toggle bit $B^{at}$ and is now routed to right consumer 22 in accordance with the previous value of toggle bit $B^{at}$.

At clock cycle $C_{23}$, token $T_5$ after waiting at prism location $1_0$ for 5 clock cycles, is passed to toggle bit $B^t$ and is now routed to right consumer 22 in accordance with the previous value of toggle bit $B^t$.

Tutoring now to the shared memory implementation of a shared pool, and with reference to FIG. 10, the implementation is similar to the shared memory implementation of a shared counter except for the following differences.

First, that the global array location includes an element location [p] per process p for holding the address addr of the DTR record b which process p is currently traversing and a value which signifies whether process p is shepherding a token or an antitoken or whether process p has been diffracted by a token or an antitoken. As before, the global array location is used to enable synchronization between potentially colliding tokens and antitokens. In practice, a diffracting collision in which a token and an antitoken are eliminated can only occur when the elements location [p] and location [q] contain the same DTR address b and one of the values signifies that one of the processes p and q is shepherding a token and the other value signifies that the other process is shepherding an antitoken. When a process p tries to collide with a process q, it does not clear location [q] but rather writes to location [q] the type of token that process p is shepherding through the tree. In this way, process q will be able to determine later if it has been collided by a token or an antitoken.

Second, the decision mechanism is preferably protected by a queue lock as described in an article entitled "Synchronization without contention" by J. M. Mellor-Crummey and M. L. Scott, Proceedings of the 4th International Conference on Architecture Support for Programming Languages and Operating Systems, April 1991 instead of the $test_{13}$ and $_{13}$ set primitive described hereinabove.

Turning now to the message passing implementation of a shared pool, the implementation is similar to the message passing implementation of a shared counter except for the following differences. Each DTR includes two toggle threads for handling tokens and antitokens. In case of a diffracting collision in which a token and an antitoken are eliminated, the prism thread returns the token and the antitoken to their respective producers. In the case that there is no collision, the prism thread forwards the tokens and the antitokens to their respective toggle threads.

In summary, it can be readily understood that the shared pool, on the one hand, behaves as a centralized pool in the sense that it ensures that an antitoken will always return a enqueued value of a token as long as that there are more tokens than antitokens while, on the other hand, it behaves as a distributed pool in the sense that there is no contention on any one particular component. The binary tree is thus a load balanced coordination medium among a distributed collection of local pools.

A Shared Stack

Briefly stated, a shared stack is a shared pool with Last In First Out (LIFO) order on the enqueued and the dequeued values. As before, a DTR implementation of a shared pool employs tokens and antitokens as described hereinabove with reference to a shared pool. However, in this case, a shared stack can be implemented as a binary tree which satisfies the gap step property: in any quiescent state $0 \leq (Y_i^t - Y_i^{at}) - (Y_j^t - Y_j^{at}) \leq 1$ where i<j. It can be shown that in the case that each DTR satisfies this gap step property, then the binary tree satisfies the gap step property too. It should also be appreciated that the gap step property induces the pool balancing property described hereinabove.

The DTR implementation of a shared stack differs from the DTR implementation of a shared pool only in that the decision mechanism contains a single toggle bit which handles both tokens and antitokens. Any non collided token toggles the toggle bit and is routed according to the previous value of the toggle bit while any non-collided antitoken toggles the toggle bit and is routed according to the updated value of the toggle bit. However, it should be noted that the use of one toggle bit for both token and antitokens typically reduces the throughput of the DTR.

For the sake of example, assume that there is a single diffracting prism 24 having three prism locations $1_0$, $1_1$ and $1_2$, tokens and antitokens have a spin time of five clock cycles, and tokens $T_1$-$T_5$ and antitokens $AT_1$-$AT_5$ arrive at diffracting prism 24 in the following fashion:

Token $T_1$ arrives at clock cycle $C_0$ and selects prism location $1_0$. Antitoken $AT_1$ arrives at clock cycle $C_1$ and selects prism location $1_1$. Antitoken $AT_2$ arrives at clock cycle $C_2$ and selects prism location $1_1$. Token $T_2$ arrives at clock cycle $C_3$ and selects prism location $1_2$. Token $T_3$ arrives at clock cycle $C_4$ and selects prism location $1_0$. Token $T_4$ arrives at clock cycle $C_5$ and selects prism location $1_1$. Antitoken $AT_3$ arrives at clock cycle $C_6$ and selects prism location $1_2$. Antitoken $AT_4$ arrives at clock cycle $C_7$ and selects prism location $1_0$. Token $T_5$ arrives at clock cycle $C_{12}$ and selects prism location $1_1$. Antitoken $AT_5$ arrives at clock cycle $C_{17}$ and selects prism location $1_0$.

At clock cycle $C_4$, a diffracting collision occurs between antitokens $AT_1$ and $AT_2$ at prism location $1_1$ such that antitoken $AT_1$ is passed to left consumer 18 while antitoken $AT_2$ is passed to right consumer 22.

At clock cycle $C_5$, a diffracting collision occurs between tokens $T_1$ and $T_3$ at prism location $1_0$ such that token $T_1$ is passed to left consumer 18 while token $T_3$ is passed to right consumer 22.

At clock cycle $C_7$, a diffracting collision occurs between token $T_2$ and $AT_3$ at prism location $1_2$ such that token $T_2$ and antitoken $AT_3$ are both eliminated. In this case, antitoken $AT_3$ returns the enqueued value carried by token $T_2$.

At clock cycle $C_{11}$, token $T_4$ after waiting at prism location $1_1$ for 5 clock cycles, is passed to the toggle bit. Thereafter, assuming that the toggle bit is in its first operative state, token $T_4$ is routed to left consumer 18.

At clock cycle $C_{13}$, antitoken $AT_4$ after waiting at prism location $1_0$ for 5 clock cycles, is passed to the toggle bit. Thereafter, the toggle bit is in its second operative state, antitoken $AT_4$ is routed to left consumer 18 according to the updated value of the toggle bit.

At clock cycle $C_{18}$, token $T_5$ after waiting at prism location $1_1$ for 5 clock cycles, is passed to the toggle bit and is now routed to left consumer 18 in accordance with the previous value of the toggle bit.

At clock cycle $C_{23}$, antitoken $AT_5$ after waiting at prism location $1_0$ for 5 clock cycles, is passed to the toggle bit and is now routed to left consumer 18 in accordance with the updated value of the toggle bit.

Turning now to the shared memory implementation of a shared stack, and with reference to FIG. 12, the implementation is similar to the shared memory implementation of a shared pool except that instead of accessing two toggle bits in the decision mechanism, the tokens and antitokens access only a single toggle bit.

Turning now to the message passing implementation of a shared stack, the implementation is similar to the message passing implementation of a shared pool except that the prism thread forwards both non-collided tokens and non-collided antitokens to the same toggle thread and that the toggle thread forwards the tokens according to its previous value and the antitokens according to its updated value.

In summary, it can be readily appreciated that the shared stack, on the one hand, behaves as a centralized stack in the sense that it ensures that an antitoken will always return the last enqueued value while, on the other hand, it behaves as a distributed stack in the sense that there is no contention on any one particular component.

While the invention has been described with respect to a limited number of embodiments, it will be appreciated that many variations, modifications and other applications of the invention may be made.

What is claimed is:

1. A diffracting token router for routing tokens according to a correctness invariant, the diffracting token router comprising:
   (a) an array of inlet wires;
   (b) an array of outlet wires;
   (c) at least one diffracting prism connected to at least one inlet wire of said array of inlet wires and at least two outlet wires of said array of outlet wires; and
   (d) a decision mechanism connected to said at least one diffracting prism and to said at least two outlet wires, the diffracting token router having:
      i) a first operative state in which two or more tokens arrive at said diffracting prism in a diffracting collision manner according to the correctness invariant, said diffracting prism routing the two or more tokens to said at least two output wires according to the correctness invariant, and
      ii) a second operative state in which one or more tokens do not arrive at said diffracting prism in a diffracting collision manner according to the correctness invariant, said diffracting prism routing the one or more tokens to said decision mechanism, thereafter said decision mechanism routing the one or more tokens to said at least two outlet wires according to the correctness invariant.

2. The diffracting token router as in claim 1 wherein the correctness invariant varies the number of tokens required for a diffracting collision as a function of the throughput of tokens therethrough.

3. The diffracting token router as in claim 1 a token waits a pre-determined spin time at said diffracting prism, said spin time being varied as a function of the throughput of tokens therethrough.

4. The diffracting token router as in claim 1 wherein said diffracting prism includes an array of at least two prism locations.

5. The diffracting token router as in claim 4 wherein each token randomly selects one of said at least two prism locations.

6. The diffracting token router as in claim 4 wherein the number of prism locations is varied as a function of the throughput of tokens therethrough.

7. A device for satisfying the step property correctness invariant: $0 \leq Y_0' - Y_1' \leq 1$, the device comprising a diffracting token router having a diffracting prism and a decision mechanism, said diffracting prism connected to an inlet wire, a first outlet wire, and a second outlet wire, said diffracting token router having:
   i) a first operative state in which a pair of tokens arrive at said diffracting prism in a diffracting collision manner according to the correctness invariant, said diffracting prism routing one of said pair of tokens to said first outlet wire and the other of said pair of tokens to said second outlet wire, and
   ii) a second operative state in which one or more tokens do not arrive at said diffracting prism in a diffracting collision manner according to the correctness invariant, said diffracting prism routing the one or more tokens to said decision mechanism, thereafter said decision mechanism alternately routing one of said one or more tokens to said first outlet wire and one of said one or more tokens to said second outlet wire.

8. A shared counter implemented as a binary tree of diffracting token routers as in claim 7 in which the output wires of the binary tree are connected to local counters.

9. A shared counter implemented as a counting network of diffracting token routers as in claim 7 in which the output wires of the counting network are connected to local counters.

10. A device accessed by tokens T and antitokens AT for satisfying the pool balancing property correctness invariant for output wires "0" and "1": in the quiescent state, if $X^t \leq X^{at}$, then $Y_0' \leq Y_0^{at}$ and $Y_1' \leq Y_1^{at}$, the device comprising a diffracting token router having a diffracting prism and a decision mechanism having a token toggle bit and an antitoken toggle bit, said diffracting prism connected to an inlet wire, a first outlet wire, and a second outlet wire, said diffracting token router having:
   i) a first operative state in which a pair of tokens arrive at said diffracting prism in a diffracting collision manner according to the correctness invariant, said diffracting prism routing one of said pair of tokens to said first outlet wire and the other of said pair of tokens to said second outlet wire,
   ii) a second operative state in which a pair of antitokens arrive at said diffracting prism in a diffracting collision manner according to the correctness invariant, said diffracting prism routing one of said pair of antitokens to said first outlet wire and the other of said pair of antitokens to said second outlet wire,
   iii) a third operative state in which a pair of a token and an antitoken arrive at said diffracting prism in a diffracting collision manner according to the correctness invariant, said token and antitoken eliminating one another,
   iv) a fourth operative state in which one or more tokens do not arrive at said diffracting prism in a diffracting collision manner according to the correctness invariant, said diffracting prism routing the one or more tokens to said token toggle bit, thereafter said token toggle bit alternately routing one of said one or more tokens to said first outlet wire and one of said one or more tokens to said second outlet wire, and
   v) a fifth operative state in which one or more antitokens do not arrive at said diffracting prism in a diffracting collision manner according to the correctness invariant, said diffracting prism routing the one or more antitokens to said antitoken toggle bit, thereafter said antitoken toggle bit alternately rotating one of said one or more antitokens to said first outlet wire and one of said one or more antitokens to said second outlet wire.

11. A shared pool implemented as a binary tree of diffracting token routers as in claim 10 in which the output wires of the binary tree are connected to local pools.

12. A shared stack implemented as a binary tree of diffracting token routers as in claim 11 in which the output wires of the binary tree are connected to local stacks.

13. A device accessed by tokens T and antitokens AT for satisfying the gap step property correctness invariant for output wires "0" and "1": in the quiescent state, $0 \leq (Y_0' - Y_0^{at}) - (Y_1' - Y_1^{at}) \leq 1$, the device comprising a diffracting token router having a diffracting prism and a decision mechanism having a toggle bit, said diffracting prism connected to an inlet wire, a first outlet wire, and a second outlet wire, said diffracting token router having:

i) a first operative state in which a pair of tokens arrive at said diffracting prism in a diffracting collision manner according to the correctness invariant, said diffracting prism routing one of said pair of tokens to said first outlet wire and the other of said pair of tokens to said second outlet wire, ii) a second operative state in which a pair of antitokens arrive at said diffracting prism in a diffracting collision manner according to the correctness invariant, said diffracting prism routing one of said pair of antitokens to said first outlet wire and the other of said pair of antitokens to said second outlet wire, iii) a third operative state in which a pair of a token and an antitoken arrive at said diffracting prism in a diffracting collision manner according to the correctness invariant, said token and antitoken eliminating one another, iv) a fourth operative state in which one or more tokens do not arrive at said diffracting prism in a diffracting collision manner according to the correctness invariant, said diffracting prism routing the one or more tokens to said decision mechanism, thereafter said decision mechanism routing one of said one or more tokens either to said first outlet wire or to said second outlet wire according to the previous value of said toggle bit, and v) a fifth operative state in which one or more antitokens do not arrive at said diffracting prism in a diffracting collision manner according to the correctness invariant, said diffracting prism routing the one or more antitokens to said decision mechanism, thereafter said decision mechanism routing one of said one or more antitokens either to said first outlet wire or to said second outlet wire according to the updated value of the said toggle bit.

* * * * *

UNITED STATES PATENT AND TRADEMARK OFFICE
CERTIFICATE OF CORRECTION

PATENT NO. : 5,586,321
DATED : December 17, 1996
INVENTOR(S) : Nir Shavit, et al It is certified that error appears in the above-indentified patent and that said Letters Patent is hereby corrected as shown below:

-Column 16 at line 34, replace $X^t \leq X^{at}$, then $Y_0^t \leq Y_0^{at}$ and $Y_1^t \leq Y_1^{at}$ with $X^t \geq X^{at}$, then $Y_0^t \geq Y_0^{at}$ and $Y_1^t \geq Y_1^{at}$.

Signed and Sealed this

Fourth Day of March, 1997

Attest:

BRUCE LEHMAN

*Attesting Officer*  *Commissioner of Patents and Trademarks*